Figure 1:
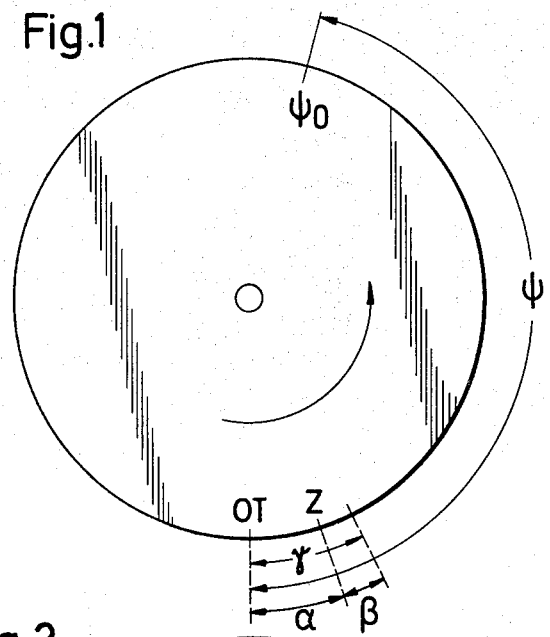

United States Patent
Hartig

[19]

[11] 3,941,103

[45] Mar. 2, 1976

[54] METHOD AND APPARATUS FOR CHANGING THE SPARK ADVANCE OF INTERNAL COMBUSTION ENGINES

[76] Inventor: Gunter Hartig, Hansastrasse 29, Karlsruhe 21, Germany, D-7500

[22] Filed: Mar. 25, 1974

[21] Appl. No.: 454,545

[30] Foreign Application Priority Data
July 26, 1973 Switzerland............... 10936/73

[52] U.S. Cl.... 123/117 R; 123/146.5 A; 123/117 D
[51] Int. Cl.² .......................................... H03K 3/00
[58] Field of Search...... 123/117 R, 117 A, 146.5 A, 123/148 E, 117 D

[56] References Cited
UNITED STATES PATENTS

| | | | |
|---|---|---|---|
| 3,696,303 | 10/1972 | Hartig | 123/148 E |
| 3,738,339 | 6/1973 | Huntzinger et al. | 123/117 R |
| 3,749,073 | 7/1973 | Asplund | 123/117 R |
| 3,757,755 | 9/1973 | Carner | 123/117 R |

Primary Examiner—Wendell E. Burns
Assistant Examiner—Joseph A. Cangelosi
Attorney, Agent, or Firm—Toren, McGeady and Stanger

[57] ABSTRACT

The invention concerns a method and apparatus for controlling the angle of advance of an internal combustion engine, in proportion to at least one parameter e.g. intake manifold vacuum, of the internal combustion engine. The main shaft of the engine has an impulse generating wheel and pickup which generates a fixed number of pulses (main pulses) during a particular revolution, the pulses representing a crank movement angle $\psi$ greater than any spark advance angle required. A fixed advance time $t$ is converted into impulses the number of which varies with engine speed, and is thereafter increased or decreased also in proportion to said engine parameter. This final number is substracted from the main pulses, and the remaining pulses (trigger pulses) counted out during the next revolution from the commencement $\psi$ 0 of the angle $\psi$. At the end of this count a firing pulse is emitted to cause a spark.

28 Claims, 12 Drawing Figures

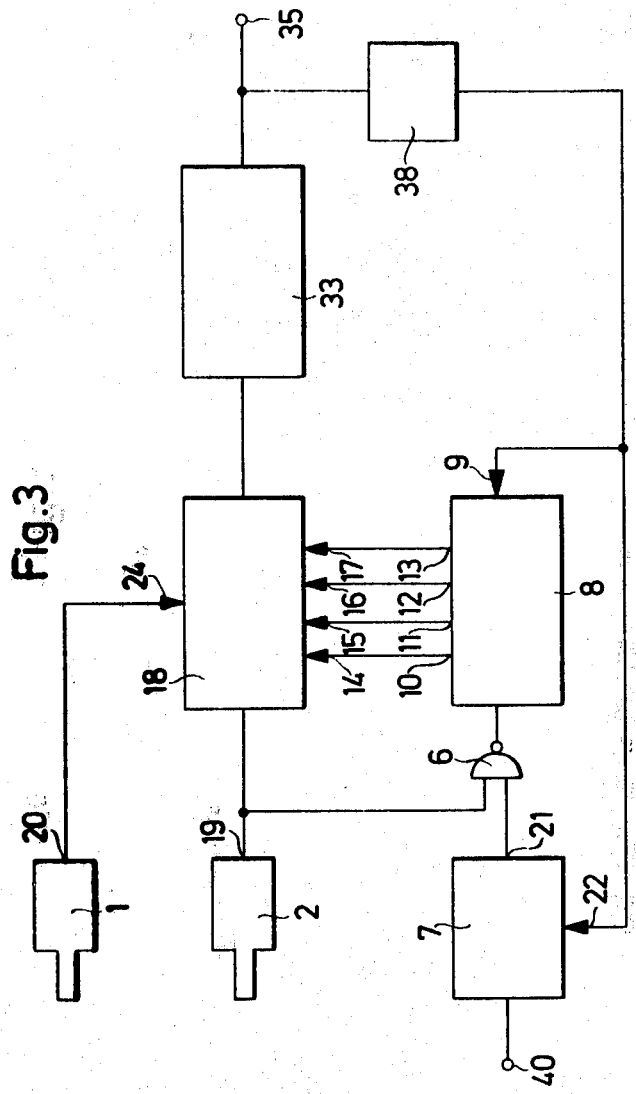

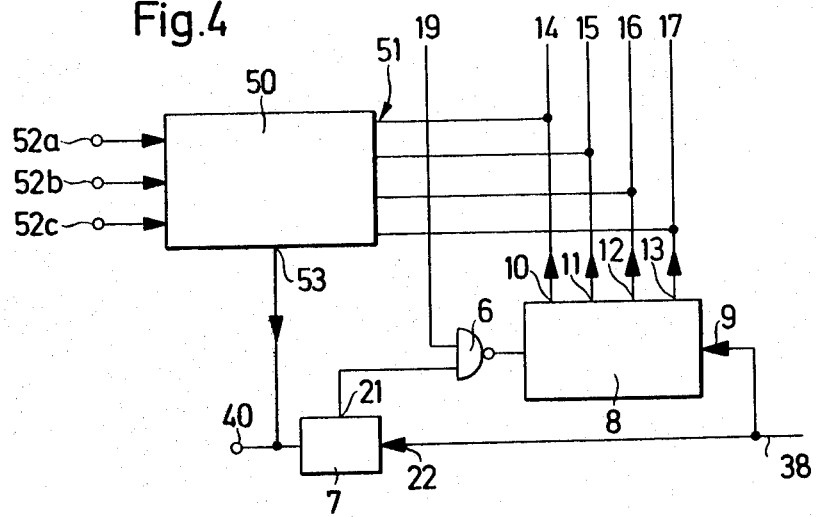
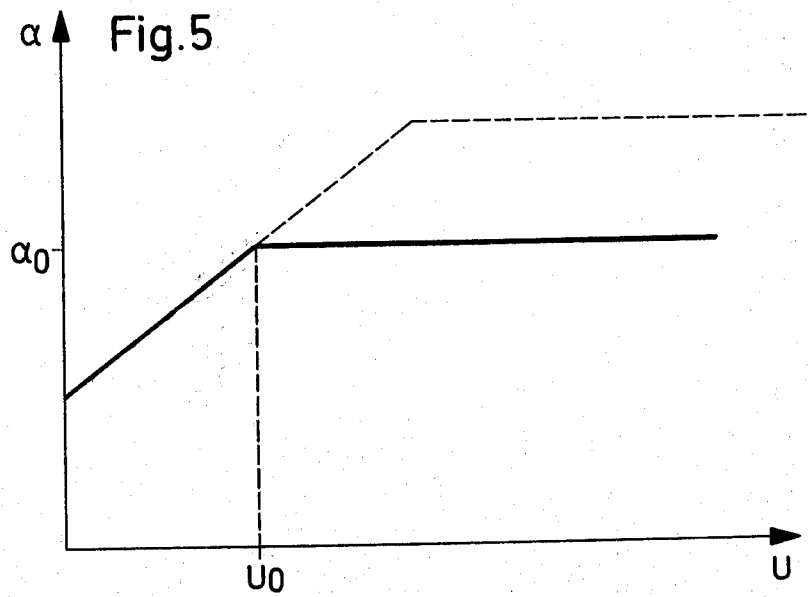

METHOD AND APPARATUS FOR CHANGING THE SPARK ADVANCE OF INTERNAL COMBUSTION ENGINES

The present invention concerns a method for changing the spark advance of internal combustion engines, in which pulse sequences are generated, the pulses (main pulses) of which are synchronously produced by the rotation of the internal combustion engine, the number of main pulses occurring during a pre-determined time $t$ being first ascertained (reference count). From this number, the advance angle $\alpha$ is calculated, dependent on the particular speed U of the internal combustion engine, by which the ignition of the internal combustion engine is to be advanced relatively to the top dead centre OT. This is deducted from a larger angle $\psi$ (reference angle) which extends from the top dead centre to an arbitrary phase position $\psi 0$ advanced relatively thereto. The position $\psi$ is a predetermined number of pulse steps (independent of the engine speed) before the count (trigger count) of the main pulses appearing from the arbitrary phase position $\psi 0$ begins. During this count, a pulse (ignition pulse) is generated when the number of pulses counted from the arbitrary phase position $\psi 0$ corresponds to the differential angle ($\psi - \alpha$) so that the ignition pulse occurs advanced by the advance angle $\alpha$ relatively to the top dead centre OT. Thus the time at which the spark precedes top dead centre is constant, but the angle $\alpha$ varies with engine speed.

Conventional internal combustion engines are driven with a spark advance characteristic which allows only for the engine speed and load in the "warm" operating condition of the internal combustion engine.

According to the current knowledge and, in particular, in view of the necessity for detoxication of exhaust gases, it is desirable to take other parameters of the internal combustion engine into consideration. If it is possible to minimise the toxic exhaust gas delivery of the internal combustion engine both in "cold" and hot operating conditions, and when idling, a method of operation would be achieved involving much less environmental pollution.

In particular, it would be desirable to have available a method and a system by which, apart from the above advantages, much easier adaptation of the ignition system to the most varied types of internal combustion engines can be achieved, whilst optimalising the particular spark advance characteristic.

According to the present invention there is provided a method of changing the spark advance characteristic of internal combustion engines, in which pulse sequences are produced, the pulses (main pulses) of which are all of equal length and derived from a rotating part of the internal combustion engine, the number of such pulses occurring during a pre-determined time $t$ being counted (reference count) and the angle of spark advance $\alpha$ relative to top dead centre, which is dependent on the speed U of the internal combustion engine, being derived therefrom, and deducted from a larger angle $\psi$ (reference angle) which extends between the top dead centre and an arbitrary phase position $\psi 0$ in advance thereof, said phase position being determined by a number of pulses independent of the engine speed before the count (trigger count) of the main pulses appearing from the arbitrary phase position $\psi 0$ begins; a pulse (ignition pulse) being generated during this count when a number of pulses has been counted from the arbitrary phase position $\psi 0$ which correspond to the differential angle $\psi - \alpha$ which is independent of the engine speed and the speed-dependent advance angle $\alpha$, so that the ignition pulse occurs advanced by the advance angle $\alpha$ relatively to the top dead centre, wherein the dependence of the advance angle $\alpha$ on the speed of rotation of the internal combustion engine changed in that the number of pulses (final number) corresponding to the effective advance angle is obtained from the number of pulses (starting number) which appear during the pre-determined time $t$ and correspond to a particular angle of rotation (starting angle) of the internal combustion engine, amended by at least one calculating operation directly applied to the starting number and/or by at least one calculating operation controlled by the output number.

Apparatus for carrying out the method comprises a device for producing pulse sequences, the pulses (main pulses) of which are of equal length and derived from a rotating part of the internal combustion engine, and comprises an arrangement for determining the number (starting number) of the main pulses appearing during a pre-determined time $t$, a device for subtracting the advance angle $\alpha$ from the reference angle $\psi$ by a trigger count, and a control device for carrying out a calculating operation with or on the starting number and/or for controlling a counting operation with or on the predetermined time $t$ dependent on the starting number.

The calculating operation applied to the starting number can either be a calculating operation applied directly with or on the starting number and/or a calculating operation for controlling a counting operation with or on the predetermined time $t$ in dependence of the starting number.

The computing operation effected directly on the starting number or on the pre-determined time $t$ on which the starting number depends, may be an addition, subtraction and/or a multiplication or division.

Figure 2:
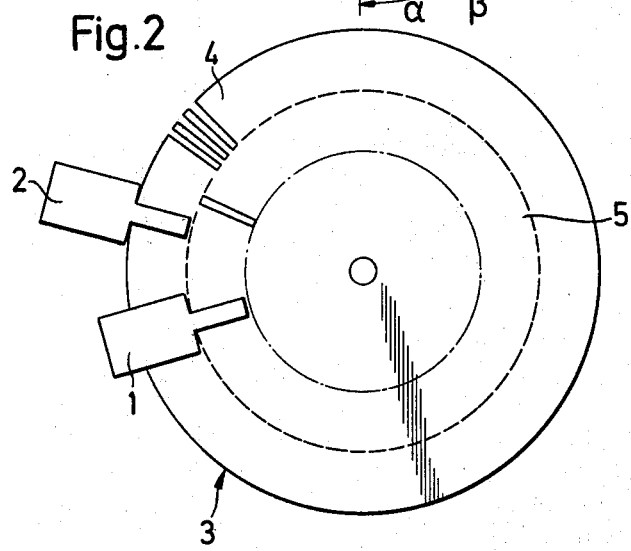
Figure 6:
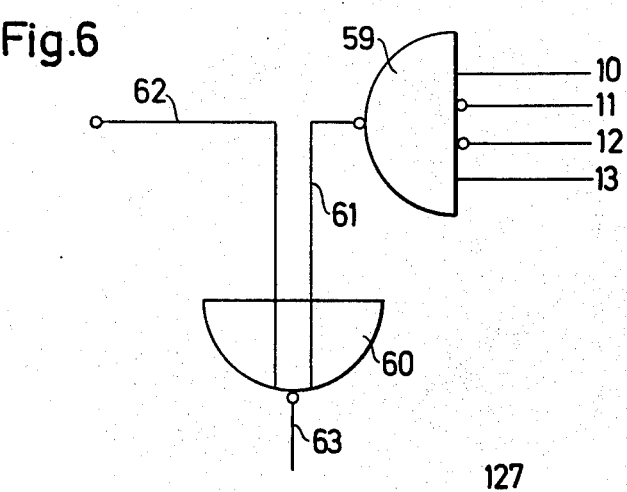
Figure 11:
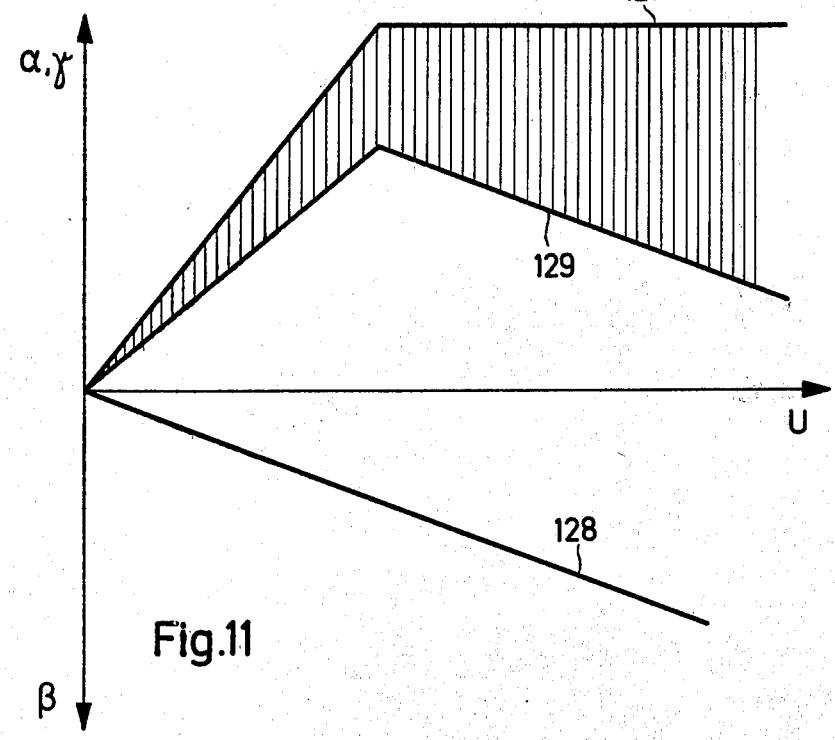
Figure 7:
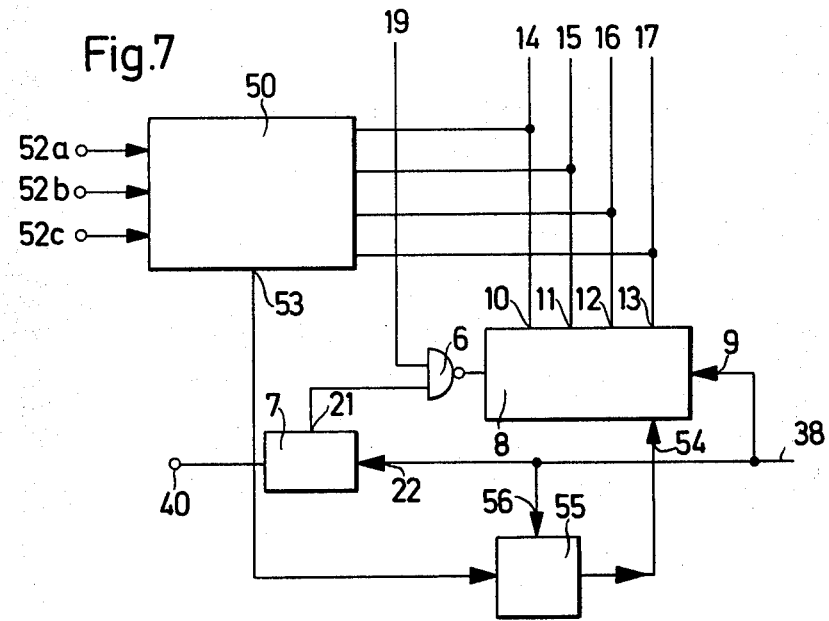
Figure 8:
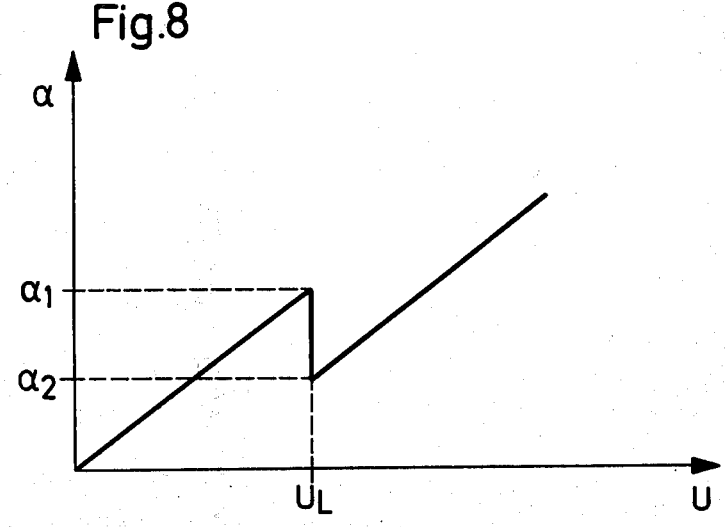
Figure 9:
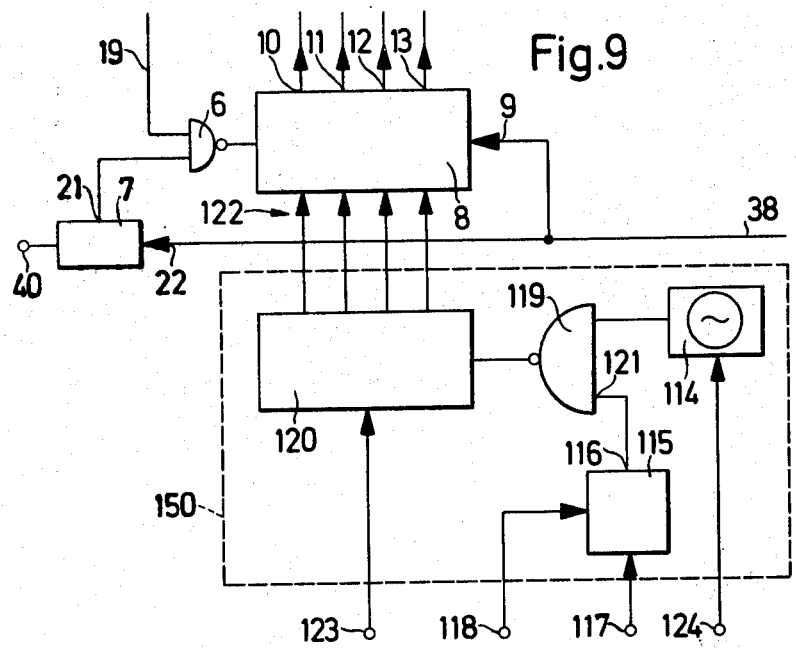
Figure 10:
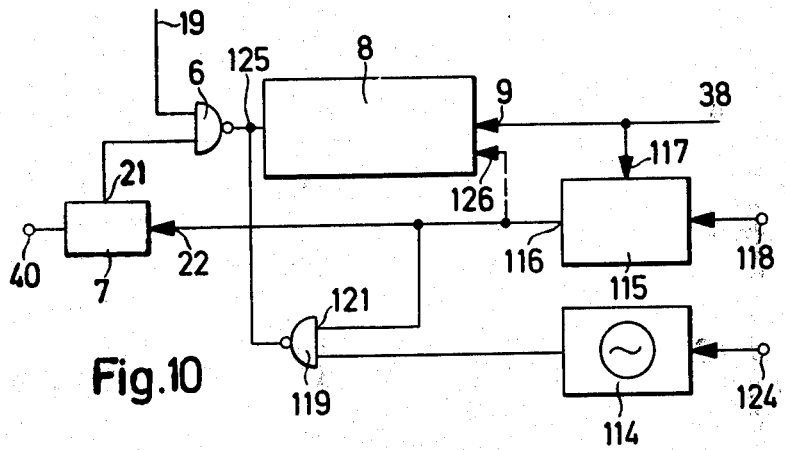
Figure 12:
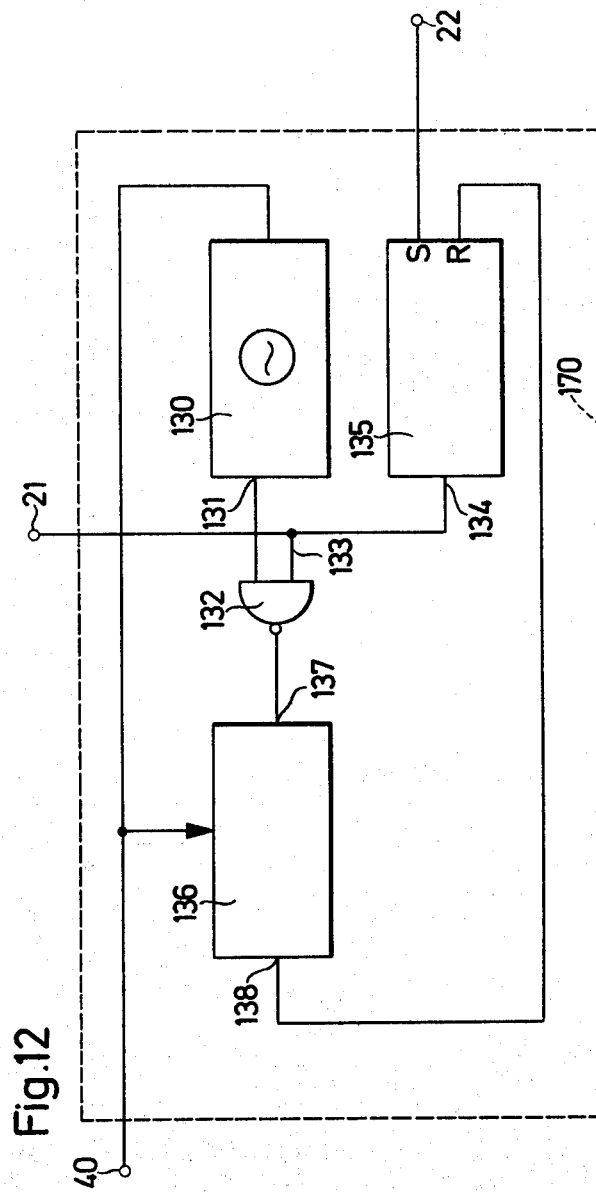

Reference is now made to the accompanying drawings, in which:

FIG. 1 shows the various angles essential for understanding the present invention, FIG. 2 shows a pulse generating device used in the present invention, FIG. 3 shows a circuit used in the present invention, FIG. 4 shows a first embodiment of the present invention, FIG. 5 shows a change in the spark advance characteristic achieved with the present invention, FIG. 6 shows a simplified form of the embodiment of FIG. 4, FIG. 7 shows a second embodiment of the present invention, FIG. 8 shows the change of the advance characteristic achieved by the embodiment of FIG. 7, FIGS. 9 and 10 show third and fourth embodiments of the present invention, FIG. 11 shows another change in the advance charateristic, achieved by the present invention; and FIG. 12 shows a function generator which can be used with the present invention.

FIG. 1 shows the position of the top dead centre OT of an engine, on a disc coupled to the crank shaft, and the position Z where the mixture is ignited in the cylinder of the engine. The angle between Z and OT is the advance angle $\alpha$.

In addition, an arbitrary phase position $\psi 0$ is shown, located ahead of the top dead centre OT and from which the actual counting processes are effected which lead to the triggering of an ignition pulse at Z. The angle $\psi$ extending from $\psi 0$ to OT, is termed the reference angle.

A system of generating ignition pulses is shown in FIGS. 2 and 3.

The system shown in FIG. 2, comprises a first transmitter 1 and a second transmitter 2 which produce pulses from the movement of a disc 3, which has teeth and gaps and is rigidly connected to a moving part of an internal combustion engine, e.g. it is keyed on the crank shaft. This disc has two rows of teeth, an outer row 4 and an inner row 5. Whilst in row 4, with which the transmitter 2 co-operates, the teeth and gaps (of which only some are shown), are uniformly distributed over the periphery, in row 5, with which the transmitter 1 co-operates, only a much smaller number of teeth and gaps are provided, one gap of which is shown in FIG. 2. Row 5 serves to produce auxiliary pulses which in turn control the computation (i.e. the work of the counters) and thus define the phase position of the pulses (main pulses) produced by the teeth and gaps of row 4. In the simplest case, the inner row 5 has only one tooth or one gap.

The pulses from the transmitter 2 are fed to a counter 8 through a gate 6 (FIG. 3) which is kept open by the function generator 7 for a predetermined time $t$. The counter 8 has a plurality of outputs corresponding to its number of binary stages, for example, four outputs 10 – 13, which are shown in FIG. 3 by a single line, each of which forms an output of a binary stage. The output values of these binary stages are connected to the set inputs 14 – 17 of the counter 18. These counting conditions are taken over by the counter 18 (which, in the present example also has four stages,) only when an auxiliary pulse appears in the transmitter 1 and is fed to the set input 24 of the counter 18 as "Take-over command".

The counter 18 continuously receives pulses from the output lead 19 of transmitter 2. The auxiliary pulse from the transmitter 2 is in such a phase that the takeover of the numerical condition of the counter 8 by the counter 18 is just ahead of the arbitrary phase position $\psi 0$ (FIG. 1), so that the main pulses from the transmitter 2 are added to this numerical condition precisely from the phase position $\psi 0$. The output of the counter 18 passes to a comparator 33 which is programed to a pre-determined numerical value corresponding to the number of pulses appearing from phase position $\psi 0$ to the top dead centre OT. At this program value, the comparator 33 delivers a pulse at the output terminal 35, said pulse representing the ignition pulse. If, therefore, the number of pulses fed through the counter 8 to the counter 18 corresponding to the speed-dependent advance angle $\alpha$ is then continuously counted in the counter 18 from the arbitrary phase position $\psi 0$, the counter 18 reaches the trigger value of the comparator 33 when the internal combustion engine (or the disc 3) has traversed the differential angle $\psi - \alpha$. The previous supply of the numerical value of the counter 8, since it corresponds to the advance angle $\alpha$, produces a subtraction of the angle $\alpha$ from the angle $\psi$, even if pulses are being continuously fed into the counter 18.

When the ignition pulse appears at the output 35, it also reaches the set input 9 of the counter 8 through a pulse former 38, and the trigger input 22 of the function generator 7. The counter 8 is reset through the reset input 9 to the numerical value "0".

The function generator 7 produces an output signal lasting for the time $t$ which always begins when a pulse appears at the trigger input 22. The time $t$ can be changed dependently on typical engine parameters, such for example as engine temperature, intake manifold vacuum, or temperature of the after-combustion reactor, by varying the input 40.

The pulse former 38 delivers a short rectangular pulse at its output. During this short rectangular pulse, the counter 8 is reset, whilst the triggering of the function generator 7 takes place only at the end of this pulse, so that the gate 6 is opened during the ensuing, pre-determined time $t$, as a result of a rectangular pulse of the length of this time, produced by the function generator 7, so that as many pulses are counted in the counter 8 as appear during the time $t$ from the transmitter 2. The greater, therefore, the speed of rotation of the disc 3, the more pulses are counted in the counter 8, so that the speed-dependent advance angle $\alpha$, which is represented by this speed, is taken into consideration during the production of the next ignition pulse, which takes place in the manner already described above.

With reference to FIGS. 4 and 5, an embodiment of the present invention is described by which it is possible to change the adjusting angle $\alpha$ non-linearly with respect to the speed of rotation of the internal combustion engine (hereinafter termed U). Such a change of this angle may be desirable for various reasons. For example, a change in the advance characteristic of the ignition may be necessary to compensate for changes of temperature, load, or the like. It may be required if the advance angle increases more slowly at higher speeds of rotation, and finally becomes zero when the internal combustion engine is fully loaded, since here the danger of intensified knocking and thermal overloading may occur, for which reason a further increase in the angle $\alpha$ is no longer desirable with increasing speed of rotation.

FIG. 4 shows only a part of the system of FIG. 3, i.e. only the part in connection to which changes have been made.

The reference numeral 50 indicates a coding matrix which has a series of first inputs 51 and a series of second inputs 52, the individual inputs 51 not being shown in detail, whilst the individual inputs 52 are indicated by 52a, 52b, 52c and so on, for purposes of description. According to the total logic condition of the individual inputs, one or more items of information which control the outgoing information appearing at the output of the function generator 7, are produced in dependence on the particular programing of the coding matrix 50, at the output 53 which may comprise a number of individual outputs.

The inputs 51 are shown as connected to the outputs 10, 11, 12 and 13 of the counter 8, although these inputs or additional inputs may communicate with other parts of the circuit arrangement of FIG. 3, in order to feed further information to the matrix 50. Whilst, therefore, internal information is fed to the matrix 50 through the inputs 51 of the circuit of FIG. 3, direct values of the internal combustion engine are fed through the inputs 52 to this matrix by corresponding scanners, feelers, converters or the like (these values may represent engine temperature, intake manifold vacuum, throttle valve position and so on).

If by using the circuit arrangement according to FIG. 4, it is intended that the advance characteristic of FIG. 5 should merge into a horizontal straight line at a specific angle $\alpha\, 0$, the coding matrix 50 assumes a simple form, shown in FIG. 6, i.e. a quadruple NAND gate 59 having two inverting inputs, the non-inverting inputs, communicating with the outputs 10 and 13 of the counter 8 and the two inverting inputs with the outputs 11 and 12 of this counter. The coding matrix 50 comprises a NOR gate 60, the first input 61 of which communicates with the output of the NAND gate 59. The other input 62 of the NOR gate, which corresponds to the input 52 of the matrix 50, communicates with a transducer on the internal combustion engine which, in a certain condition of the engine, e.g. under full acceleration, gives a signal "0". In these circumstances, a positive pulse appears at the output 63 of the NOR gate 60 which corresponds to the output 53 of the matrix 50 when the counting condition "9", i.e. the binary combination "1001", appears in the counter 8.

Due to the circuit provided in the function generator 7, this positive output pulse modifies the time $t$, which would appear without this positive pulse, lengthening or shortening it. In the present embodiment, the function generator 7 is designed so that, due to a positive pulse entering through the output 63, the time $t$ is stopped and therefore the counter 8 receives no further pulses through the output of the function generator 7 and the gate 6, and remains in the condition "9" of the counter. As a result of this, the advance characteristic becomes horizontal straight line during the last-mentioned condition of the counter 8, which represents a specific advance angle $\alpha\, 0$. If, on the other hand, the full acceleration signal were missing from the input 62 of the NOR gate 60, the counter 8 would count as far as its design permits, in the present case, as far as the condition "15", with the result that the advance characteristic is converted to a horizontal straight line (portion in broken lines in FIG. 5) only after the count of 15.

Although, in the present embodiment, mention is made of the transition of the advance characteristic into a horizontal straight line, it is also possible to affect the time basis of the function generator 7 by the positive pulse from the output of the matrix 50, so that the time remaining from the overall time $t$ from the beginning of the positive signal, is lengthened or shortened by a pre-determined factor. By this means so-called "inflection positions" are achieved in the advance charateristic at these points, at which the rise of the advance characteristic assumes a different value from that in the preceding section. Several inflection positions may be obtained in the adjusting characteristic according to the design of the matrix 50 terminating with a transition into a horizontal straight line.

FIG. 7 shows an embodiment by which it is possible to produce inflections in the advance characteristic.

The circuit arrangement of FIG. 7 corresponds to the circuit arrangement of FIG. 4, but with the difference that the output 53 of the matrix 50 is no longer connected to an input of the function generator 7, but is used to influence the counter directly without changing the time $t$, whilst, if desired, as in the previous embodiment, a blocking logic circuit 55 may be provided between the output 53 and the correcting input 54 of the counter 8. This blocking logic 55 acts so that a command appearing at the output 53 can effect the correction of the counter 8 only $n$ times, e.g. only once (per working cycle of the counter). This is important for corrections in a retard direction, such as, in a case when the signal from the output 53 means "revert from condition 5 to condition 3 of the counter", since otherwise, if the correction were not limited to a single time per cycle of the counter 8, this correction would continually be effected with the result that the counter would never get beyond condition 5. With the above-mentioned order to correct, a jump in the advance characteristic is effected from a pre-determined angle $\alpha\, 1$ to the angle $\alpha\, 2$ as shown in FIG. 8, the angle $\alpha\, 1$ corresponding to the condition "5" and the angle $\alpha\, 2$ corresponding to the condition "3" of the counter.

If, on the other hand, a change upwards is to be made in the advance characteristic, the blocking logic 53 is unnecessary, since the value triggering the change occurs only once in the counting cycle of the counter 8.

With regard to the input 56 of the blocking logic 55, it may be observed that it serves to set the blocking logic into a condition of preparedness and, for this purpose, it is connected to the output of the pulse former 38, the output pulse of which sets the blocking logic so that, in the next cycle of the counter, a single order can be transmitted thereby to the counter 8 again.

The above-mentioned upward change may be associated with idling speed. Since the engine runs faster with increasingly advanced ignition, the idling speed stabilises itself in this case at the position of the change located at the idling speed $U_L$ (see FIG. 8).

IN the description of FIG. 3, it was explained that it may be advisable not to return the counter 8 to the value "0000" before the beginning of this new cycle, but to a predetermined binary value which is dependent on certain operating conditions of the engine. This value may be produced in a digital convertor 150 as shown in FIG. 9;

The function of this digital convertor is generally known; it comprises a frequency generator 114 the frequency of which is adjustable by an input signal and a function generator 115 which transmits a pulse of the duration $s_1$ to its output 116 when a trigger pulse appears at the trigger input 117; otherwise it corresponds in its design and mode of operation to the function generator 7 in FIG. 3. In this case also, the duration of the time $s_1$ can be changed by a corresponding signal applied to the input 118. Furthermore, the digital convertor comprises a NAND gate 119 which serves to admit pulses from the frequency generator 114 to the counter 120, which is also associated with the digital convertor, only for as long as the time signal $s_1$ appears at the input 121. The numerical value which is established in the counter 120 due to the pulses counted by 114, appears as a binary value on the setting input 122 of the counter 8 (not shown in FIG. 3).

It should be observed that the trigger pulse for the input 117 of the function generator 115, as also the reset pulse for the input 122 of the counter 120, must be arranged so that the counting in the counter 120 is concluded when the set command appears at the input 9 of the counter 8.

In this manner, the advance characteristic is controllable by one or more engine parameters, the advance characteristic of the engine being controlled through the counter 8. Due to the output value of the counter 120 appearing at the input 122 of the counter 8, the comparator can also be re-programamed.

In FIG. 10, a circuit arrangement is shown based on the circuit arrangement of FIG. 9, in which, however, the counter 120 does not appear since its function is assumed by the counter 8. This is achieved in that the output pulse of the pulse former 38 is transmitted to the trigger input 22 of the function generator 7, not as in the case of FIG. 3, but by interposing the function generator 115 between the output of the pulse former 38 and the trigger input 22 of the function generator 115. Due to this arrangement, the counter 8 is reset by the output pulse of the pulse former 38 and the function generator 115 simultaneously triggered through the input 117 of the function generator 115, so that the output pulse of the function generator 115 begins with the time $s_1$. This pulse opens the gate 119 through the input 121 so that the pulses of the frequency generator 114 reach the counter 8 through the counting input 125. The frequency of the generator 114 is controlled through the input 124 by any desired engine parameter.

In this arrangement it is possible to provide an additional connection (shown in broken lines) between the output 116 and a change-over input 126 of the counter 8, so that the counting direction of the latter counter is reversed during the time pulse $s_1$.

The counter 8 has a pre-determined (positive or negative) numerical value, which depends on the duration $s_1$, the frequency of the generator 114 and the direction of counting of the counter 8, at the end of the time pulse $s_1$.

The switch-off flank of the time pulse $s_1$ then triggers the function generator 7, so that the counting-in operation of the pulses of the transmitter 2 through the gate 6 into the counter 8 now takes place in the above described manner.

With reference to FIG. 3, it should be pointed out that it is possible to feed the control pulse which occurs at the output 20 of the transmitter 1, to the input 24, with a time and/or angle delay. This may be effected by connecting a counter upstream of the input 24, which is controlled by the pulse appearing in the transmitter 1, and counts pulses appearing at the output of the transmitter 2, and also is programed, so that, in a pre-determined state of the count, it transmits a control pulse to the associated input 24. An angular adjustment is thereby achieved.

The time lag, in addition to the angular retardation, and also by itself, may be achieved by using one or more time delay members.

An example of such a time delay is described in greater detail hereinafter with reference to FIG. 11 which illustrates the relationship between the crank shaft angle $\alpha$ and the engine speed U.

In this embodiment a time delay member is inserted between the output 20 of the pulse transmitter 1 and the input 24 of the time delay member; the value of the time delay of this member is controlled by engine characteristic values. In order to describe and illustrate the effect of this feature of the present invention more clearly, it is assumed, however, in the embodiment according to FIG. 11, that the time delay is constant.

The original advance characteristic, as apparent without the time delay member, is shown by the curve 127 and the associated angle $\gamma$ (FIG. 1) which has been obtained in connection with features explained in the description of FIG. 5. If the time lag alone is concerned, a straight line 128 (FIG. 11) would be obtained which produces a correcting angle $\beta$ dependent on the engine rate of rotation, this correcting angle representing a displacement of the output signal at the output 35 and, consequently, of the ignition point Z for a retarded ignition. The angle $\beta$ is shown in FIG. 1 for a certain speed of rotation.

The effective advance characteristic 129 is obtained from a superposition of the advance characteristic 127 and the straight line 128. The angle on which this advance characteristic 129 is based is the actual advance angle $\alpha$ and is also shown in FIG. 1.

By varying the time delay a characteristic "field" may be produced between the two characteristics 127 and 129.

It should be pointed out that the working counter 18 may also be simultaneously used as a measurement counter 8 in the embodiments.

FIG. 12 shows a preferred embodiment of the function generator 7 of the circuit arrangement according to FIG. 3.

The function generator 170 comprises a frequency generator 130, the output 131 of which is connected to the NAND gate 132. The other input 133 of the NAND gate is connected to the output 134 of the RS flip-flop 135. On the arrival of a trigger command through the input 39, the condition "1" occurs at the output 134, so that the counter counts pulses from the frequency generator 130 through its counting input 137. When the counter 136 has reached a pre-determined value, a pulse which is applied to the R input of the RS flip-flop 135, appears at its output 138. This pulse resets the RS flip-flop back into its resting condition so that the condition "0" appears at the output 134.

Due to this mode of operation, a time pulse $t$ appears at the output 21 and the duration of this pulse is determined by the frequency of the generator 130 plus the pre-determined condition of the counter 136. Both the latter values may be controlled jointly or separately through the input 40, whilst the frequency of the generator 130 may be controlled by way of a mechanical transducer.

If required, the generator 130 may be combined with the generator 114 shown in FIG. 10, particularly if both are to be controlled by the same output values.

Because of the digital mode of operation of the present invention, most of the apparatus may be produced by the integrated circuit technique.

Since the time $t$ of the function generator and/or the time corresponding to the advance angle (according to the calculating operation) and the pulses controlling these times are closely related to the instantaneous operating condition of the internal combustion engine, they may also be used for other control operations of the internal combustion engine and/or the device driven thereby.

I claim:

1. A method of changing the spark advance characteristic of internal combustion engines, in which pulse sequences are produced, the main pulses of which are all of equal length and derived from a rotating part of the internal combustion engine, including the steps of counting the number of such pulses occurring during a pre-determined time $t$ (reference count) this representing a desired angle of spark advance $\alpha$ relative to engine top dead centre, and is dependent on the speed of the internal combustion engine, deducting said count from a larger angle $\psi$ count (reference angle) which extends between said top dead centre and an arbitrary phase position $\psi$ 0 in advance thereof, said angle $\psi$ being represented by a predetermined number of pulses which is independent of the engine speed, starting a pulse count (trigger count) from said position $\phi\,0$, and generating an ignition pulse during said trigger count when the number of pulses counted from the arbitrary phase position $\psi\,0$ corresponds to the differential angle $\psi - \alpha$, so that the ignition pulse occurs advanced by the advance angle $\alpha$ relatively to the engine top dead centre, wherein the dependence of the advance angle $\alpha$ on the speed of rotation of the internal combustion engine changes in that the number of pulses (final number) corresponding to the effective advance angle is obtained from the number of pulses which appear during the pre-determined time $t$ (starting number) amended by at least one calculating operation applied to said starting number, said calculating operation depending on a parameter of said engine operation.

2. A method as recited in claim 1, wherein at least one calculating operation is carried out over all engine speeds.

3. A method as recited in claim 1, wherein at least one calculating operation is carried out over a part of the range of engine speed.

4. A method as recited in claim 1, wherein at least one calculating operation is carried out only at specific range(s) of engine speeds.

5. A method as recited in claim 4, wherein the range(s) of engine speed in which said calculating operation is to be effected, is determined by operating values of said internal combustion engine.

6. A method as recited in claim 4, wherein said calculating operation is effected by internal programing.

7. A method as recited in claim 1, wherein said calculating operation involves a plain arithmetical process.

8. A method as recited in claim 1, wherein said calculating operation is used only for a part of said starting numerical value.

9. A method as recited in claim 1, wherein from a pre-determined engine speed said pre-determined time $t$ is reduced to such a value that said advance angle $\alpha$ remains constant from said engine speed to higher engine speeds.

10. A method as recited in claim 1, wherein at a pre-determined engine speed a pre-determined number is subtracted from or added to said starting number so that a jump is obtained in said advance characteristic.

11. A method as recited in claim 1, wherein a number depending on an operating parameter of said internal combustion engine, is added to said starting number.

12. A method as recited in claim 11, wherein said additional number is produced by means of a digital convertor controlled by operating characteristics of said internal combustion engine.

13. A method according to claim 11, wherein the said number is added by means of a frequency generator controlled by pre-determined operating characteristics of said internal combustion engine.

14. A method as recited in claim 1, wherein said starting number is multiplied by a factor which varies with said speed ranges, so that the advance characteristic curve has different slopes in various engine speed ranges.

15. A method as recited in claim 1, wherein a smaller number than said starting number and proportional to said engine speed, is subtracted from said starting number, so that the angle $\gamma$ corresponding to said pre-determined time $t$ is reduced by an angle $\beta$ proportional thereto.

16. A method as recited in claim 15, wherein said smaller number is subtracted by beginning said trigger count later by a pre-determined time lag from said arbitrary phase position $\psi\,0$.

17. Apparatus for changing the spark advance characteristics of internal combustion engines comprising an internal combustion engine, a device for producing pulse sequences, the pulses (main pulses) of which are of equal length and derived from a rotating part of said internal combustion engine, said pulses including a pulse representing an advance angle $\alpha$ and a reference angle $\psi$, an arrangement for determining the number (starting number) of main pulses appearing during a pre-determined time $t$, a device for subtracting said advance angle $\alpha$ from said reference angle $\psi$ by a trigger count, and a control device for carrying out a calculating operation on said starting number to amend said number proportionally to a parameter of an operation of said engine, said control device comprising a coding matrix coupled to the counting output of a measuring counter counting during said pre-determined time $t$, the output signal of said matrix being connected to a correcting input of said counter in such manner that the duration of said reference count is changed according to said output signal of said coding matrix.

18. Apparatus as recited in claim 17, including means for limiting the duration of said reference count when that said advance angle remains constant over a pre-determined range of engine speed.

19. Apparatus as recited in claim 17, wherein said coding matrix includes a multiple NAND gate which has an output and inverted and non-inverted inputs, means for coupling said inputs to counting outputs of said measuring or working counter, means for coupling said output to an input of a NOR gate which is coupled by at least one other input to a measuring value indicator (transducer) of said internal combustion engine, the output signal of said NOR gate being connected to said function generator in such manner that the duration of said reference count can be changed according to said output signal of said NOR gate.

20. Apparatus as recited in claim 17, wherein the output of said coding matrix is connected via a blocking logic circuit to a correcting input of said measuring or working counter in such manner that a command signal appears at the output of said coding matrix and achieves a correction in said counter once per working cycle of said counter.

21. Apparatus as recited in claim 17 wherein said control device comprises a digital converter.

22. Apparatus as recited in claim 20, wherein said digital converter is operated in such manner that it increments said starting number in dependence on the value applied to the input of said converter.

23. Apparatus as recited in claim 20, wherein said measuring or working counter obtaining said starting number also assumes the function of the counter of said digital converter.

24. Appartus as recited in claim 23, wherein said measuring or working counter has an input controlling the count (forward or backward) through which said count is effected as a digital converter, compared with the counting direction in the mode of operation of said measuring or working counter.

25. Apparatus as recited in claim 17, wherein said control device includes means for retarding the beginning of said trigger count in proportion to said engine speed.

26. Apparatus as recited in claim 25, wherein said retarding means is a time delay member for the pulse (auxiliary pulse) controlling said trigger count.

27. Apparatus as recited in claim 26, wherein said means controlling the duration of said reference count is a digital time base generator operating on the counting principle.

28. Apparatus as recited in claim 27, including a frequency generator which serves both as a generator for a digital converter and for said digital time base generator and is controllable by the same input value by way of the frequency correcting input.

* * * * *